(12) United States Patent
Liu

(10) Patent No.: US 12,136,819 B2
(45) Date of Patent: Nov. 5, 2024

(54) POWER CONVERSION SYSTEM

(71) Applicant: DARFON ELECTRONICS CORP., Taoyuan (TW)

(72) Inventor: Wei-Lin Liu, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 0 days.

(21) Appl. No.: 18/131,357

(22) Filed: Apr. 5, 2023

(65) Prior Publication Data

US 2023/0327448 A1 Oct. 12, 2023

Related U.S. Application Data

(60) Provisional application No. 63/328,267, filed on Apr. 6, 2022.

(30) Foreign Application Priority Data

Mar. 29, 2023 (TW) .................................. 112111919

(51) Int. Cl.
*H02J 3/32* (2006.01)
*H02J 3/38* (2006.01)
*H02J 7/00* (2006.01)

(52) U.S. Cl.
CPC ................ *H02J 3/32* (2013.01); *H02J 3/381* (2013.01); *H02J 7/0063* (2013.01); *H02J 2300/24* (2020.01)

(58) Field of Classification Search
CPC .. H02J 3/32; H02J 3/381; H02J 7/0063; H02J 2300/24
See application file for complete search history.

(56) References Cited

U.S. PATENT DOCUMENTS

| | | | |
|---|---|---|---|
| 10,389,178 B2 | 8/2019 | Lee | |
| 2023/0106094 A1* | 4/2023 | Salter | B60L 53/30 |
| | | | 320/109 |
| 2023/0215308 A1* | 7/2023 | Kwon | G09G 3/3233 |
| | | | 345/214 |
| 2023/0216338 A1* | 7/2023 | Patwa | B60L 3/0092 |
| | | | 307/23 |

FOREIGN PATENT DOCUMENTS

| | | |
|---|---|---|
| JP | 2016-167913 A | 9/2016 |
| JP | 2018-46604 A | 3/2018 |
| JP | 2018-207776 A | 12/2018 |
| TW | 355867 | 4/1999 |
| TW | M601482 U | 9/2020 |

* cited by examiner

*Primary Examiner* — Daniel Cavallari
(74) *Attorney, Agent, or Firm* — Winston Hsu

(57) ABSTRACT

A power conversion system (PCS) includes an alternating current (AC) power port, a first direct current (DC) power port, a second DC power port, a high voltage capacitor, a first DC converter, a second DC converter, a power inverter, and a microcontroller unit. The microcontroller unit adjusts a frequency of an AC power output by the power conversion system based on a voltage difference across the high voltage capacitor of the power conversion system to switch the frequency of the AC power between different frequencies.

9 Claims, 7 Drawing Sheets

POWER CONVERSION SYSTEM

CROSS REFERENCE TO RELATED APPLICATION

This application claims the benefit of U.S. Provisional Application No. 63/328,267, filed on Apr. 6, 2022. The content of the application is incorporated herein by reference.

BACKGROUND OF THE INVENTION

1. Field of the Invention

The present invention is related to a power conversion system (PCS), in particular to a power conversion system that can adjust the output AC frequency according to the charged ratio of a rechargeable battery.

2. Description of the Prior Art

Power conversion system (PCS) is a bidirectional power conversion inverter that can be used for on-grid and off-grid electrical power storage applications. The efficient operation of a power conversion system has always been an important issue in this technical field.

SUMMARY OF THE INVENTION

A power conversion system of the present invention comprises an alternating current power port, a first direct current power port, a second direct current power port, a high voltage capacitor, a first DC converter, a second DC converter, a DC/AC inverter, a microcontroller unit. The alternating current power port is coupled to a photovoltaic inverter. The first direct current power port is coupled to a rechargeable battery. The second direct current power port is coupled to a solar panel. The first DC converter is coupled between the high voltage capacitor and the first DC power port. The second DC converter is coupled between the high voltage capacitor and the second DC power port. The DC/AC inverter is coupled between the high voltage capacitor and the AC power port. The microcontroller unit is for adjusting the frequency of an AC output from the AC power port by the power conversion system according to the voltage difference between two ends of the high voltage capacitor. When the microcontroller unit detects mains off-grid and the voltage difference is greater than a first critical value, the microcontroller unit sets a frequency of the AC output from the AC power port as a cut-off frequency, so that the photovoltaic inverter stops outputting power. When the microcontroller unit detects mains off-grid and the voltage difference is between the first critical value and a second critical value for a continuous time exceeding a predetermined time length, the microcontroller unit sets the frequency of the AC output from the AC power port as the cut-off frequency. When the microcontroller unit detects mains off-grid and the voltage difference is between the second critical value and a third critical value, the microcontroller unit increases the frequency of the AC output from the AC power port by a first predetermined value. The first critical value is greater than the second critical value, and the second critical value is greater than the third critical value.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
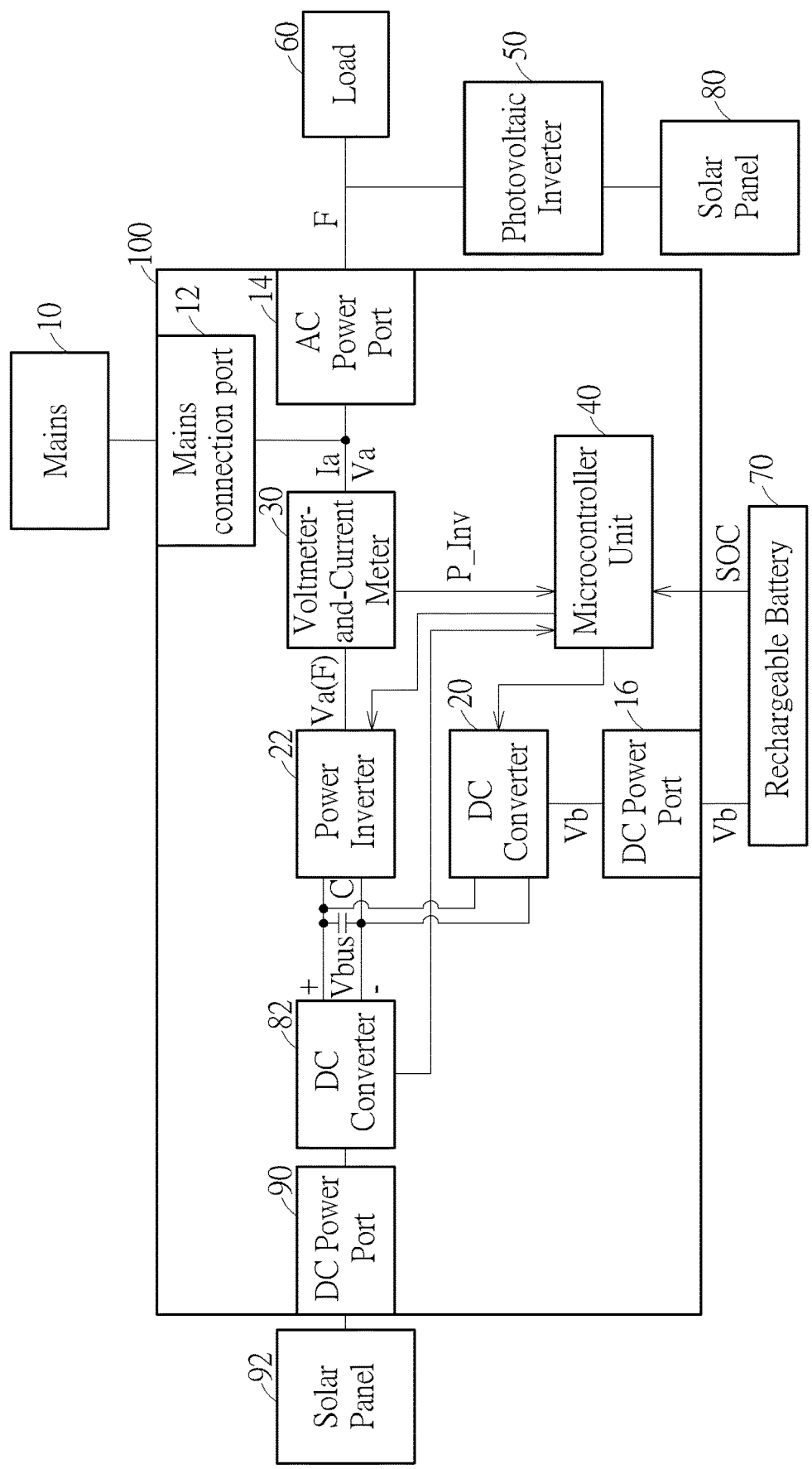
FIG. 1 is a functional block diagram of a power conversion system according to an embodiment of the present invention and the coupled mains, load, rechargeable battery, photovoltaic inverter, and solar panel.

FIG. 1 is a functional block diagram of a power conversion system (PCS) according to an embodiment of the present invention and the coupled mains 10, a load 60, a rechargeable battery 70, a photovoltaic inverter (PV inverter) 50, a solar panel 80 and a solar panel 92. The solar panel 80 and the solar panel 92 are used to convert light into power. The PV inverter 50 converts the direct current power generated by the solar panel 80 to alternating current power, and feeds the converted alternating current into the load 60 and/or the power conversion system 100.

The power conversion system 100 includes a mains connection port 12, an AC power port 14, a DC power port 16, a high voltage capacitor C, a DC converter 20, a power inverter 22, a voltmeter-and-current meter 30, a DC converter 82, a DC power port 90 and a microcontroller unit (MCU) 40. The power conversion system 100 can be connected to the mains 10 through the mains connection port 12 and receive power from the mains 10. The DC power port 16 is coupled to the rechargeable battery 7, and the power conversion system 100 can charge the rechargeable battery 70 through the DC power port 16 or receive power from the rechargeable battery 70. The voltmeter-and-current meter 30 is coupled to the AC power port 14 to detect the voltage Va and current Ia output from the AC power port 14 by the power conversion system 100, wherein the voltage Va and the current Ia are the AC voltage and the AC current respectively. The MCU 40 controls the operation of the power conversion system and receives a state-of-charge signal SOC from the rechargeable battery 70. Wherein, the MCU 40 can obtain the current charged ratio of the rechargeable battery 70 according to the state-of-charge signal SOC, and obtain the output power P_Inv of the power conversion system 100 according to the voltage Va and current Ia detected by the voltmeter-and-current meter 30. Wherein, when the output power P_Inv is positive, it means that the power conversion system 100 outputs power through the AC power port 14; and when the output power P_Inv is negative, it means that the power conversion system 100 receives power from the outside through the AC power port 14. The DC converter 20 is coupled between the high voltage capacitor C and the DC power port 16 for converting the DC voltage Vb output by the rechargeable battery 70 into a voltage difference Vbus between two ends of the high voltage capacitor C. The DC converter 82 is coupled between the high voltage capacitor C and the DC power port 90 for converting the DC voltage output by the solar panel 92 into a voltage difference Vbus between the two ends of the high voltage capacitor C. Therefore, the size of the voltage difference Vbus is determined by the DC voltage Vb and the DC voltage output by the solar panel 92. The power inverter 22 is coupled between the high voltage capacitor C and the AC power port 14 for converting the voltage difference Vbus into an AC voltage Va, and the frequency of the AC voltage Va is F.

Figure 2:
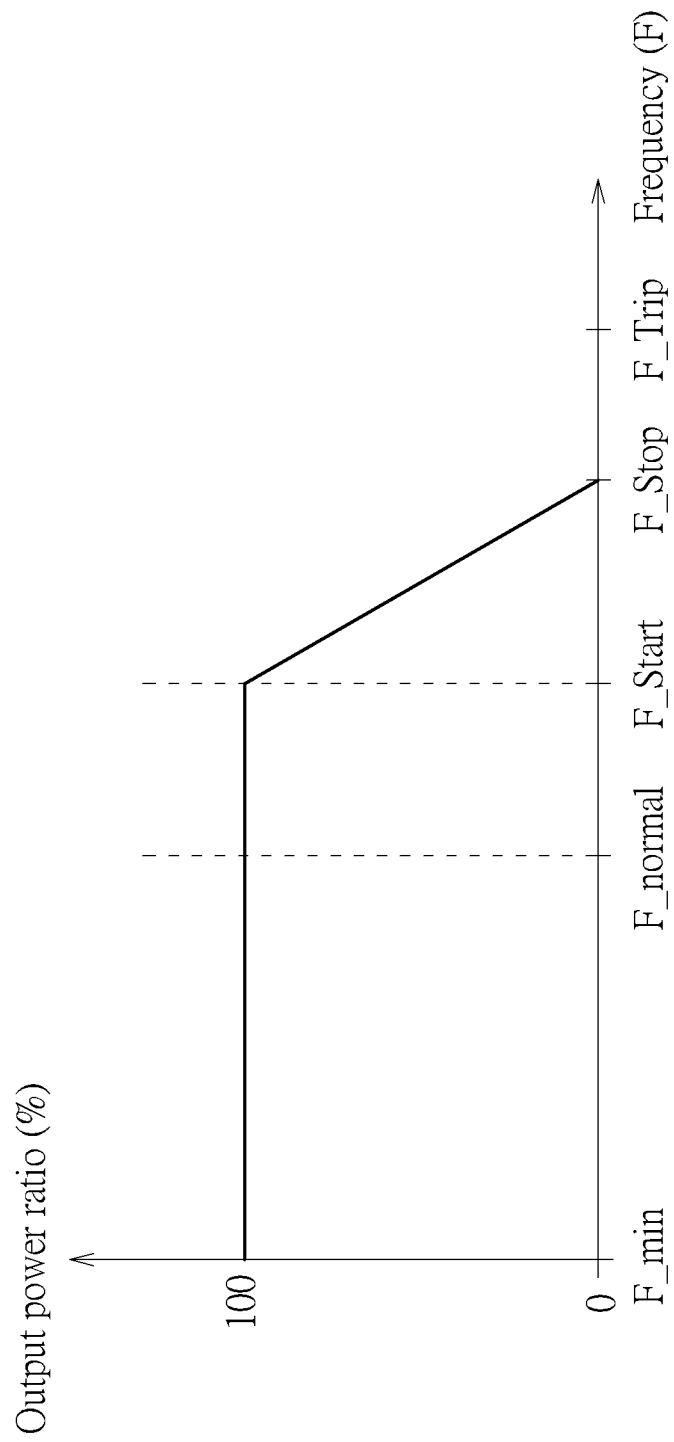
FIG. 2 is a relationship diagram between the output power ratio of the photovoltaic inverter in FIG. 1 and the frequency of the alternating current output by the power conversion system.

Please refer to FIG. 2. FIG. 2 is a relationship diagram between the output power ratio of the photovoltaic inverter 50 in FIG. 1 and the frequency F of the alternating current output by the power conversion system 100. The horizontal axis of FIG. 2 represents the frequency F of the AC power output by the power conversion system 100 from the AC power port 14, and the vertical axis of FIG. 2 represents the output power ratio of the photovoltaic inverter 50. The position marked 100 on the vertical axis in FIG. 2 indicates that the output of the photovoltaic inverter 50 is at the maximum value (i.e. 100%), and the position marked 0 on the vertical axis indicates that the output of the photovoltaic inverter 50 is stopped. Furthermore, when the frequency F is between F_Start and F_Stop, the output power ratio and the frequency F have a linear inverse relationship, that is, the larger the output power ratio at this time, the lower the AC frequency F will be. Wherein F_min<F_normal<F_Start<F_Stop, and F_min represents the minimum value of the frequency F of the alternating current output by the power conversion system 100, and F_normal is the frequency of the power conversion system 100 in general normal operation. The output power ratio corresponding to F_Start is equal to 100%, and the output power ratio corresponding to F_Stop is equal to 0%. Wherein, F_min may be referred to as "minimum frequency", F_normal may be referred to as "normal frequency", F_Start may be referred to as "start frequency", and F_Stop may be referred to as "stop frequency". The start frequency F_Start is, for example, 60 Hertz (Hz), and the stop frequency F_Stop is, for example, 60.5 Hz. Furthermore, there is another cut-off frequency F_trip, which forces the photovoltaic inverter 50 to stop outputting power, so that the power conversion system 100 enters into over-frequency protection (F_Trip is, for example, 60.6 Hz. Since the photovoltaic inverter 50 stops outputting power once the frequency F of the alternating current exceeds F_Trip, the frequency F_trip may be referred to as the "cut-off frequency").

The DC converter 82 can detect the voltage difference Vbus between the two ends of the high voltage capacitor C, and transmit the data of the voltage difference Vbus to the microcontroller unit 40, so that the microcontroller unit 40 adjusts the frequency F according to the voltage difference Vbus to control the output power of the photovoltaic inverter 50. Furthermore, when the microcontroller unit 40 detects that the mains off-grid (for example: when the connection between the connection port 12 and the mains 10 is cut off or the mains 10 is powered off), the microcontroller unit 40 can adjust the frequency F according to the voltage difference Vbus, and then adjust the output power of the photovoltaic inverter 50. For example, the normal value of the voltage difference Vbus is 400 to 430 volts, and when the voltage difference Vbus exceeds 450 volts, it means that the high-voltage capacitor C has accumulated too much energy. Therefore, at this time, the microcontroller unit 40 will first turn off the solar panel 92, and then turn off the photovoltaic inverter 50. Furthermore, if the voltage difference Vbus is less than 450 volts but greater than 430 volts, the frequency F is increased so that the photovoltaic inverter 50 reduces its output power.

Figure 3A:
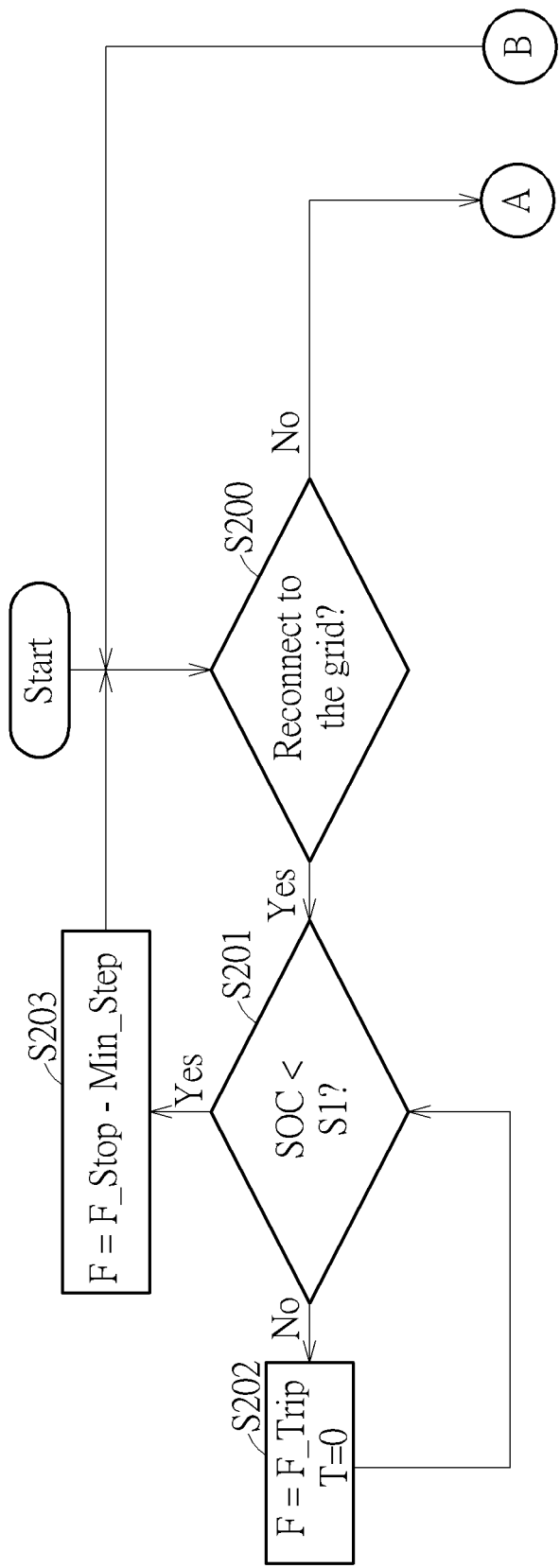
FIG. 3A and FIG. 3B are flowcharts of the microcontroller unit in FIG. 1 controlling the power conversion system.
Figure 3B:
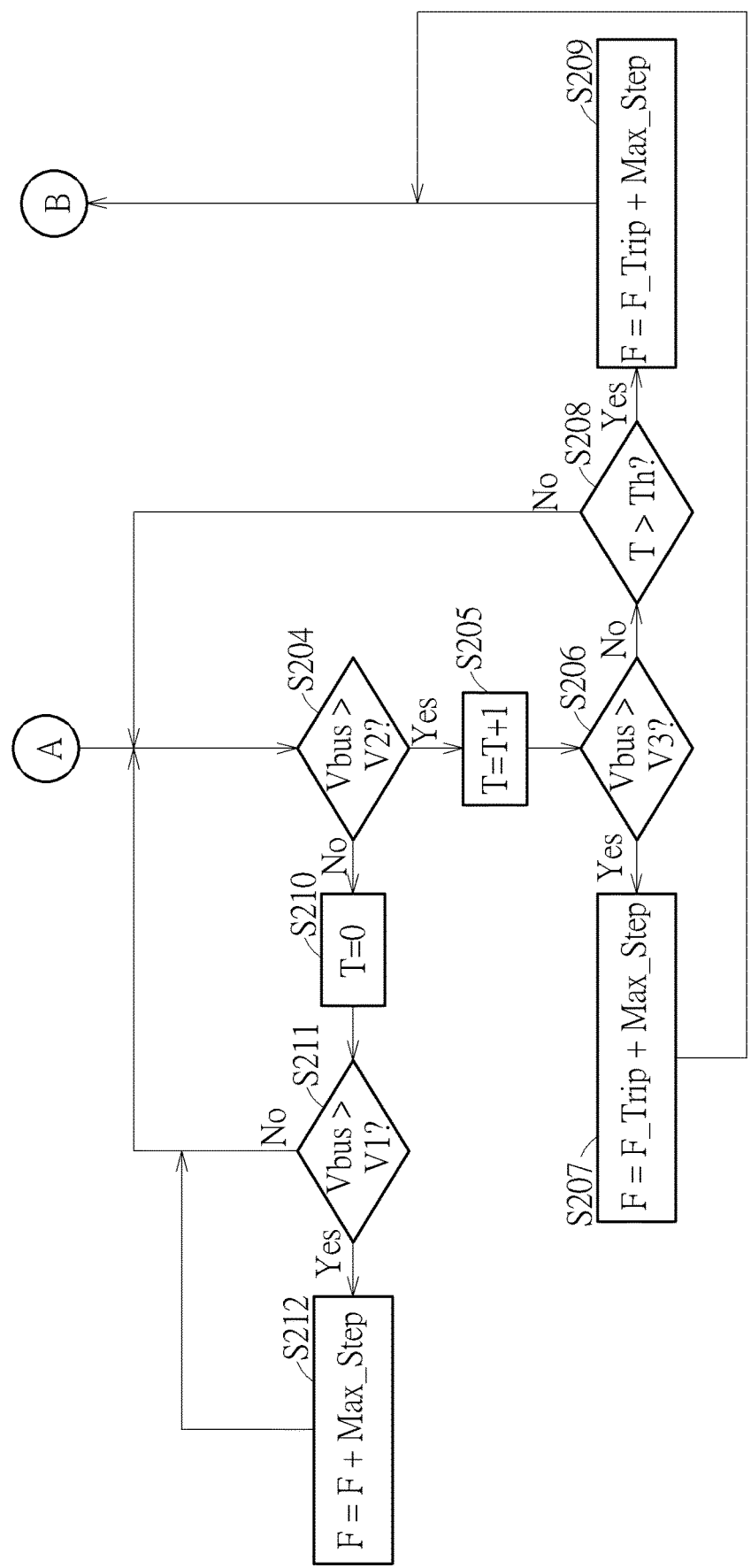

Please refer to FIG. 3A and FIG. 3B, FIG. 3A and FIG. 3B are flowcharts of the control of the power conversion system 100 by the microcontroller unit 40 of FIG. 1. When the microcontroller unit 40 detects that the mains off-grid (for example: when the connection between the connection port 12 and the mains 10 is cut off or the mains 10 is powered off) or reconnected and feeding to the grid, the microcontroller unit 40 executes the process of FIG. 3A and FIG. 3B, and this process includes the following steps:

Step S200: the microcontroller unit 40 determines whether the power conversion system 100 is reconnected to the grid, wherein when the conversion system 100 is reconnected to the mains 10 or the photovoltaic inverter 50 starts to supply power; it means that the power conversion system 100 is reconnected to the grid. When the microcontroller unit 40 determines that the power conversion system 100 has been reconnected to the grid, execute step S201; otherwise, execute step S204;

Step S201: the microcontroller unit 40 determines whether the current charged ratio of the rechargeable battery 70 is less than a predetermined ratio S1 according to the state-of-charge signal SOC, wherein the predetermined ratio S1 may between 10% and 80%, if the microcontroller unit 40 determines that the current charged ratio of the rechargeable battery 70 is not less than the predetermined ratio S1, then execute step S202; otherwise, execute step S203;

Step S202: the microcontroller unit 40 resets the accumulated time T of its timer to zero (T=0), and the frequency F of the alternating current output by the power conversion system 100 from the alternating current power supply port 14 is set as the cut-off frequency F_trip, so that the photovoltaic inverter 50 stops outputting power, and the power conversion system 100 enters the over-frequency protection; return to step S201;

Step S203: the microcontroller unit 40 lowers the frequency F from the stop frequency F_Stop by a predetermined value Min_Step (i.e. F=F_Stop−Min_Step), so that the photovoltaic inverter 50 can output power, and return to step S200. The predetermined value Min_Step can be equal to ((F_Stop−F_Start)/8);

Step S204: the microcontroller unit 40 determines whether the voltage difference Vbus between the two ends of the high voltage capacitor C is greater than the critical value V2. Wherein, the critical value V2 can be, for example, 445 volts to 455 volts; if the microcontroller unit 40 determines that the voltage difference Vbus is greater than the critical value V2, then execute step S205; otherwise, execute step S210;

Step S205: the timer in the microcontroller unit 40 adds 1 to its accumulated time;

Step S206: the microcontroller unit 40 determines whether the voltage difference Vbus between the two ends of the high voltage capacitor C is greater than the critical value V3. Wherein, the critical value V3 can be 465 volts to 475 volts; if the microcontroller unit 40 determines that the voltage difference Vbus is greater than the critical value V3, then execute step S207; otherwise, execute step S208;

Step S207: the microcontroller unit 40 increases the frequency F to (F_Trip+Max_step), so that the photovoltaic inverter 50 coupled to the AC power port 14 stops outputting power, and enters the over-frequency protection. Wherein, Max_step is, for example, 0.3 Hz or equal to ((F_Stop−F_Start)/2). Furthermore, once the frequency F of the alternating current reaches above F_Trip, the photovoltaic inverter 50 stops outputting power, therefore, when the frequency F of the alternating current is equal to (F_Trip+Max_step), it is more guaranteed that the photovoltaic inverter 50 stops outputting power; return to step S200;

Step S208: the microcontroller unit 40 determines whether the accumulated time T of the timer is greater than the predetermined time length Th. The predetermined time length Th can be, for example, 5 seconds, and when the microcontroller unit 40 determines that the accumulated time T of its timer is greater than the predetermined time length Th, then execute step S209; otherwise, return to step S204;

Step S209: the microcontroller unit 40 increases the frequency F to (F_Trip+Max_step), so that the photovoltaic inverter 50 coupled to the AC power port 14 stops outputting power, and enters the over-frequency protection. After the microcontroller unit 40 executes step S209, return to step S200;

Step S210: the microcontroller unit 40 resets the accumulated time T of its timer to zero (T=0);

Step S211: the microcontroller unit 40 determines whether the voltage difference Vbus between the two ends of the high voltage capacitor C is greater than the critical value V1. Wherein, the critical value V1 can be 425 volts to 435 volts; if the microcontroller unit 40 determines that the voltage difference Vbus is greater than the critical value V1, then execute step S212; otherwise, execute step S204; and Step S212: the microcontroller unit 40 increases the frequency F by Max_step, that is, F=(F+Max_step), so that the photovoltaic inverter 50 reduces the output power; return to step S204.

When the photovoltaic inverter 50 detects that the voltage or frequency exceeds the normal operating range, it starts protection (for example: overvoltage, under voltage, over frequency, under frequency, islanding . . . etc.), and then no longer outputs power and feeds to the grid, at this time, the microcontroller unit 40 determines whether the photovoltaic inverter 50 has tripped, and adjusts the AC output frequency F of the power conversion system 100 according to the state to determine whether the photovoltaic inverter 50 can be reconnected and fed to the grid. If the photovoltaic inverter 50 detects that the voltage and frequency of the mains terminal meet the normal operating range, it determines that the condition for reconnecting to the grid is met, and the photovoltaic inverter 50 counts a certain number of seconds (for example: 300 seconds as specified by grid-connected regulations) and will be fed into the grid output.

Figure 4:
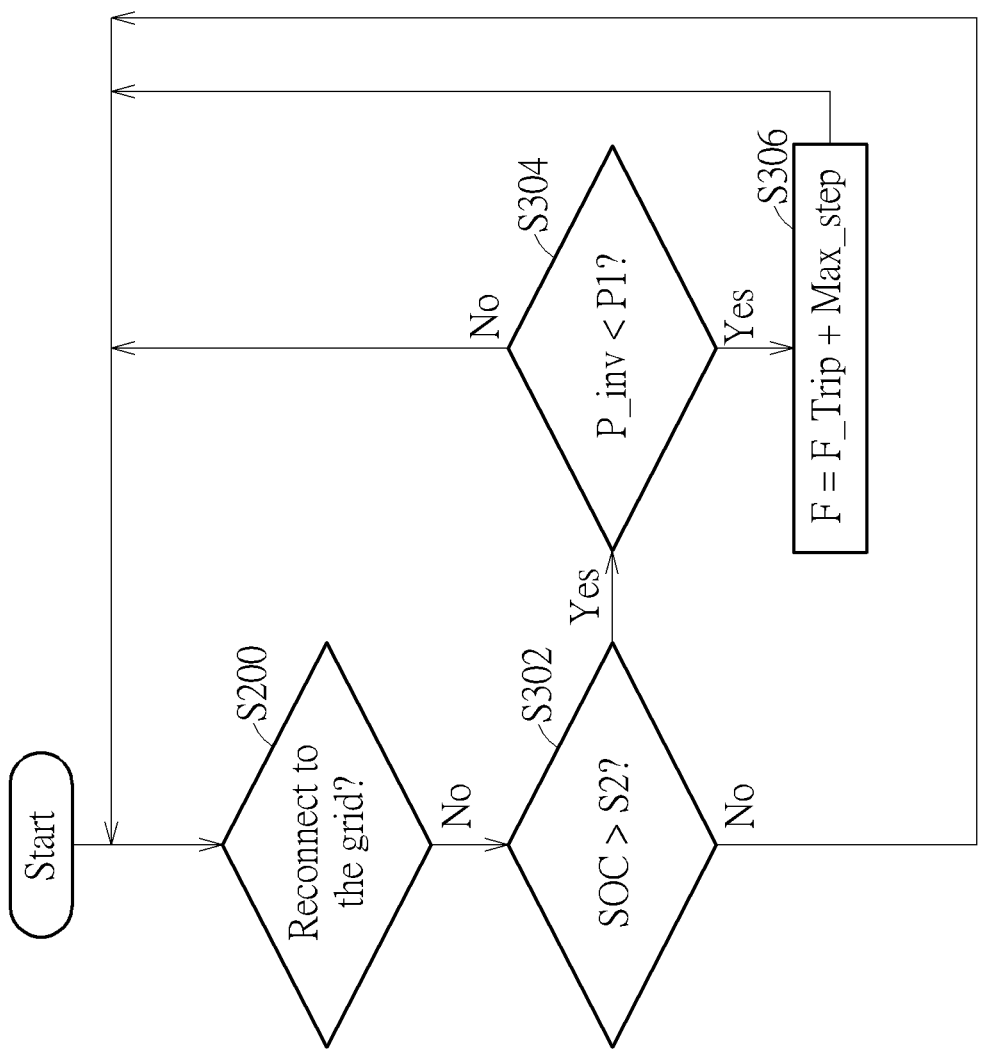
FIG. 4 is another flow chart of the microcontroller unit in FIG. 1 controlling the power conversion system.

In another embodiment of the present invention, in addition to executing the flow in FIG. 3A and FIG. 3B according to the voltage difference Vbus, the microcontroller unit 40 will also execute the flow in FIG. 4 according to the current charged ratio of the rechargeable battery 70. The flow chart in FIG. 4 includes the following steps:

Step S200: this step is the same as step S200 in FIG. 3A, that is, the microcontroller unit 40 determines whether the power conversion system 100 is reconnected to the grid. When the microcontroller unit 40 determines that the power conversion system 100 is reconnected to the network, execute step S201 in FIG. 3A; otherwise, execute step S302;

Step S302: the microcontroller unit 40 determines whether the current charged ratio of the rechargeable battery 70 is greater than a predetermined ratio S2 according to the state of charge signal SOC, wherein the predetermined ratio S2 is, for example, between 20% and 90%, and when the microcontroller unit 40 determines that the current charged ratio of the rechargeable battery 70 is greater than the predetermined ratio S2, execute step S304; otherwise, execute step S200;

Step S304: the microcontroller unit 40 determines whether the output power P_Inv is less than the predetermined power P1, wherein the predetermined power P1 (for example, 500 watts), and can be adjusted according to different control requirements. When the microcontroller unit 40 determines that the output power P_Inv is less than the predetermined power P1, execute step S306; otherwise, return to step S200; and Step S306: the microcontroller unit 40 increases the frequency F of the alternating current output by the power conversion system 100 from the alternating current power supply port 14, so that the photovoltaic inverter 50 coupled to the alternating current power supply port 14 stops outputting power and enters the over-frequency protection. For example: the microcontroller unit 40 increases the frequency F of the alternating current to (F_Trip+Max_step). Wherein, F_Trip is, for example, 60.6 Hz, and Max_step is, for example, 0.3 Hz. Furthermore, once the frequency F of the alternating current reaches above F_Trip, the photovoltaic inverter 50 stops outputting power and the frequency F_trip may be referred to as a cut-off frequency. Therefore, when the frequency F of the alternating current is equal to (F_Trip+Max_step), it is more guaranteed that the photovoltaic inverter 50 stops outputting power; when the microcontroller unit 40 completes step S306, return to step S200.

Figure 5A:
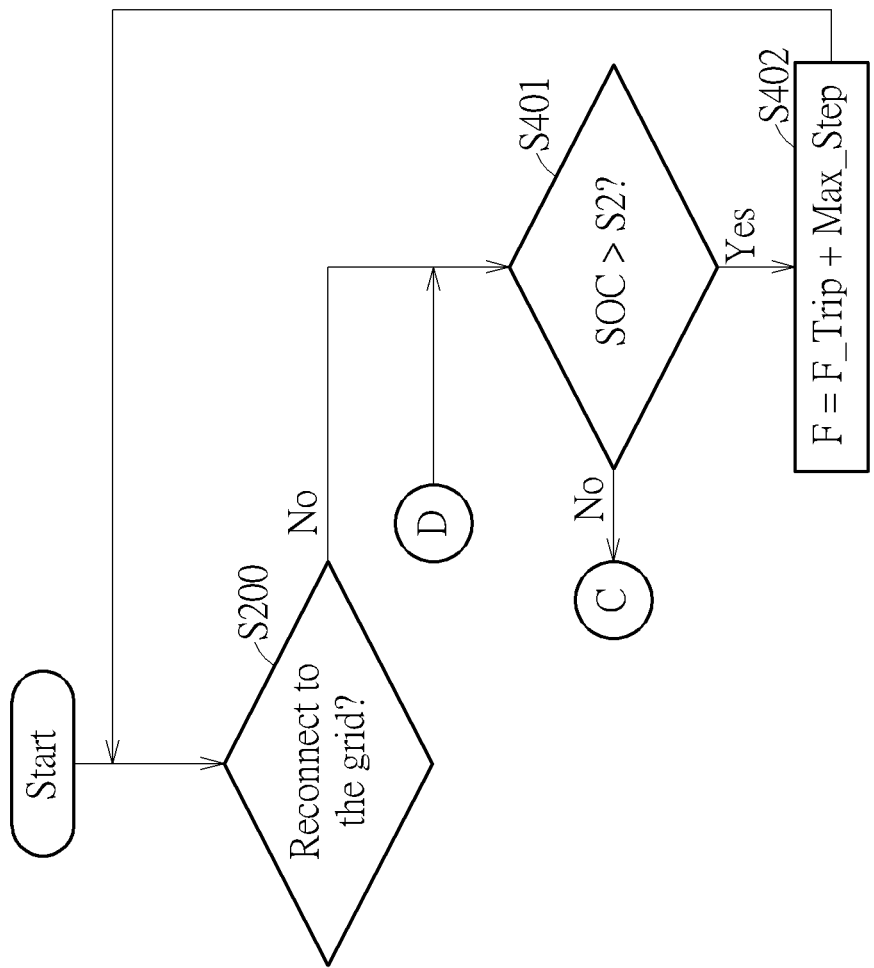
FIG. 5A and FIG. 5B are another flowchart of the microcontroller unit of FIG. 1 controlling the power conversion system.
Figure 5B:
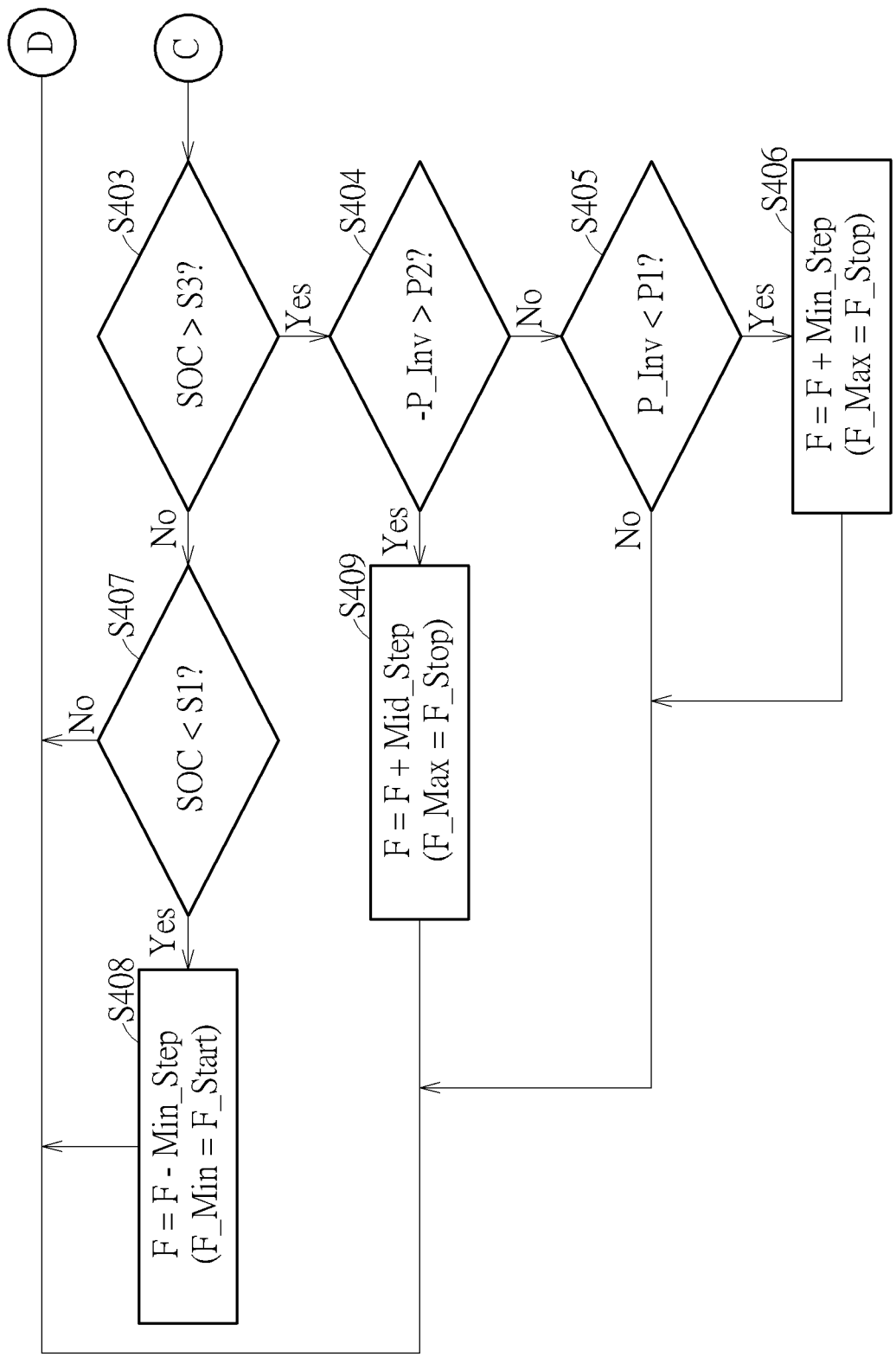

In another embodiment of the present invention, in addition to executing the flow in FIG. 3A and FIG. 3B according to the voltage difference Vbus, the microcontroller unit 40 will also execute the flow in FIG. 5A and FIG. 5B according to the current charged ratio of the rechargeable battery 70. The flow in FIG. 5A and FIG. 5B includes the following steps:

Step S200: this step is the same as step S200 in FIG. 3A, that is, the microcontroller unit 40 determines whether the power conversion system 100 is reconnected to the grid. When the microcontroller unit 40 determines that the power conversion system 100 is reconnected to the network, execute step S201 in FIG. 3A; otherwise, execute step S401;

Step S401: the microcontroller unit 40 determines whether the current charged ratio of the rechargeable battery 70 is greater than a predetermined ratio S2 according to the state of charge signal SOC, wherein the predetermined ratio S2 may between 20% and 90%, and when the microcontroller unit 40 determines that the current charged ratio of the rechargeable battery 70 is greater than the predetermined ratio S2, execute step S402; otherwise, execute step S403;

Step S402: the microcontroller unit 40 increases the frequency F of the alternating current output by the power conversion system 100 from the alternating current power supply port 14 to (F_Trip+Max_Step), so that the photovoltaic inverter 50 coupled to the alternating current power supply port 14 stops outputting power and enters the over-frequency protection. Wherein, F_Trip is, for example, 62 Hz, and Max_step is, for example, 0.3 Hz. Furthermore, once the frequency F of the alternating current reaches above F_Trip, the photovoltaic inverter 50 stops outputting power and the frequency F_Trip may be may be referred to as a "cutoff frequency". Therefore, when the frequency F of the alternating current is equal to (F_Trip+Max_step), it is more guaranteed that the photovoltaic inverter 50 stops outputting power. Furthermore, Max_Step can be equal to ((F_Stop−F_Start)/2), and F_Trip is greater than F_Stop. When the microcontroller unit 40 finishes executing step S402, return to step S200;

Step S403: the microcontroller unit 40 determines whether the current charged ratio of the rechargeable battery 70 is greater than the predetermined ratio S3 according to the state of charge signal SOC. Wherein, the predetermined ratio S3 is smaller than the predetermined ratio S2, and can range from 15% to 85%. When the microcontroller unit 40 determines that the current charged ratio of the rechargeable battery 70 is greater than the predetermined ratio S3, execute step S404; otherwise, execute step S407;

Step S404: the microcontroller unit 40 determines whether the negative value of the output power P_Inv (i.e. −P_Inv) is greater than the predetermined power P2. Wherein, when the negative value of the output power P_Inv is positive, it means that the power conversion system 100 receives power from the outside, and the predetermined power P2 is, for example, 1000 watts, but not limited thereto. When the microcontroller unit 40 does not determine that the negative value of the output power P_Inv is greater than the predetermined power P2, execute step S405; and when the microcontroller unit 40 determines that the negative value of the output power P_Inv is greater than the predetermined power P2, execute Step S409;

Step S405: the microcontroller unit 40 determines whether the output power P_Inv is less than the predetermined power P1. Wherein, the predetermined power P1 is smaller than the predetermined power P2, and the predetermined power P1 is, for example, 500 watts, but not limited thereto. When it is determined that the output power P_Inv is less than the predetermined power P1, execute step S406; otherwise, return to step S401;

Step S406: the microcontroller unit 40 increases the frequency F by a predetermined value Min_Step (i.e. F=F+Min_Step), and return to step S401. Wherein, the predetermined value Min_Step may be equal to ((F_Stop−F_Start)/8), and the frequency F is adjusted up to F_Stop in this step, that is, the maximum value F_Max of the frequency F in this step is F_Stop. The function of step S406 is: when the current charged ratio of the rechargeable battery 70 is greater than the predetermined ratio S3, and the output power P_Inv is lower than the predetermined power P1, the output power of the photovoltaic inverter 50 is reduced by increasing the frequency F;

Step S407: the microcontroller unit 40 determines whether the current charged ratio of the rechargeable battery 70 is less than the predetermined ratio S1 according to the state of charge signal SOC. Wherein the predetermined ratio S1 is smaller than the predetermined ratios S2 and S3, and can be between 10% and 80%. When the microcontroller unit 40 determines that the current charged ratio of the rechargeable battery 70 is smaller than the predetermined ratio S1, execute step S408; otherwise, return to step S401;

Step S408: the microcontroller unit 40 lowers the frequency F by a predetermined value Min_Step (i.e. F=F−Min_Step), and return to step S401. Wherein the frequency F is adjusted minimum to F_Start in this step, that is, the minimum value F_Min of the frequency F in this step is F_Start. The function of step S408 is: when the current charged ratio of the rechargeable battery 70 is less than the predetermined ratio S1, the output power of the photovoltaic inverter 50 is increased by lowering the frequency F; and Step S409: the microcontroller unit 40 raises the frequency F by a predetermined value Mid_Step (i.e. F=F+Mid_Step), and return to step S401. Wherein the predetermined value Mid_Step can be equal to ((F_Stop−F_Start)/4), and the frequency F is adjusted up to F_Stop in this step, that is, the maximum value F_Max of frequency F in this step is F_Stop. The function of step S409 is: when the current charged ratio of the rechargeable battery 70 is greater than the predetermined ratio S3, and the power received by the power conversion system 100 from the outside is greater than the predetermined power P2, by increasing the frequency F, the output power of the photovoltaic inverter 50 is reduced.

When the microcontroller unit 40 of the present invention detects mains off-grid, it allows the power conversion system 100 to output the AC frequency F, then induce the photovoltaic inverter 50 not to enter the Islanding protection and can generate power and feed the grid, its energy can be supplied to the load 60 and the power conversion system 100. The microcontroller unit 40 can dynamically adjust the frequency of the alternating current output by the power conversion system 100 according to the voltage difference Vbus between the two ends of the high voltage capacitor C, the current charged ratio of the rechargeable battery 70, and the positive or negative magnitude of the output power P_Inv. Therefore, the overall power flow of the power conversion system 100 can be efficiently regulated.

Those skilled in the art will readily observe that numerous modifications and alterations of the device and method may be made while retaining the teachings of the invention. Accordingly, the above disclosure should be construed as limited only by the metes and bounds of the appended claims.

DESCRIPTION OF REFERENCE NUMERALS

10: Mains
12: Mains connection port
14: AC Power Port
16, 90: DC Power Port
20, 82: DC Converter
22: Power Inverter
30: Voltmeter-and-Current Meter
40: Microcontroller Unit
50: Photovoltaic Inverter
60: Load
70: Rechargeable Battery
80, 92: Solar Panel
100: Power Conversion System
C: High Voltage Capacitor
F: Frequency
F_min: Minimum Frequency
F_normal: Normal Frequency
F_Start: Start Frequency
F_Stop: Stop Frequency
F_Trip: Cut-off Frequency
Ia: Current
P_Inv: Output Power
Va: Voltage
Vb: DC Voltage
Vbus: Voltage Difference
SOC: State-of-Charge Signal
S200 to S212, S302 to S306, S401 to S409: Steps

What is claimed is:

1. A power conversion system (PCS) comprising:
an alternating current (AC) power port coupled to a photovoltaic inverter;

a first direct current (DC) power port coupled to a rechargeable battery;

a second direct current (DC) power port coupled to a solar panel;

a high voltage capacitor;

a first DC converter coupled between the high voltage capacitor and the first DC power port;

a second DC converter coupled between the high voltage capacitor and the second DC power port;

a DC/AC inverter coupled between the high voltage capacitor and the AC power port; and a microcontroller unit (MCU) for adjusting a frequency of an AC output from the AC power port by the power conversion system according to a voltage difference between two ends of the high voltage capacitor;

wherein when the microcontroller unit detects mains off-grid, and the voltage difference is greater than a first critical value, the microcontroller unit sets the frequency of the AC output from the AC power port as a cut-off frequency, so that the photovoltaic inverter stops outputting power;

wherein when the microcontroller unit detects mains off-grid, and the voltage difference is between the first critical value and a second critical value for a continuous time exceeding a predetermined time length, the microcontroller unit sets the frequency of the AC output from the AC power port as the cut-off frequency;

wherein when the microcontroller unit detects mains off-grid, and the voltage difference is between the second critical value and a third critical value, the microcontroller unit increases the frequency of the AC output from the AC power port by a first predetermined value; and wherein the first critical value is greater than the second critical value, and the second critical value is greater than the third critical value.

2. The power conversion system of claim 1, wherein the first critical value is 465 volts to 475 volts, the second critical value is 445 volts to 455 volts, and the third critical value is 425 volts to 435 volts.

3. The power conversion system of claim 1, wherein when the microcontroller unit detects mains off-grid and a current charged ratio of the rechargeable battery is greater than a first predetermined ratio, and an output power of the power conversion system is lower than a first predetermined power, the microcontroller unit increases the frequency of the AC, so that the photovoltaic inverter stops outputting power.

4. The power conversion system of claim 3, wherein when the microcontroller unit detects mains off-grid and determined that the current charged ratio of the rechargeable battery is greater than the first predetermined ratio and the output power is less than the first predetermined power, and when the voltage difference is smaller than the first critical value, the power conversion system supplies the power from the rechargeable battery to a load.

5. The power conversion system of claim 1, wherein when the microcontroller unit detects mains off-grid, and determined that a current charged ratio of the rechargeable battery is greater than a first predetermined ratio, the microcontroller unit adjusts the frequency of the AC to a first frequency, so that the photovoltaic inverter stops outputting power.

6. The power conversion system of claim 5, wherein when the microcontroller unit detects mains off-grid, and determined that the current charged ratio of the rechargeable battery is less than the first predetermined ratio and greater than a second predetermined ratio, and a negative value of an output power of the power conversion system is greater than the first predetermined power, the microcontroller unit increases the frequency of the AC output from the AC power port by the first predetermined value.

7. The power conversion system of claim 6, wherein when the microcontroller unit detects mains off-grid, and determined that the current charged ratio of the rechargeable battery is less than a third predetermined ratio, the frequency of the AC output from the AC power port is lowered by a second predetermined value.

8. The power conversion system of claim 7, wherein when the microcontroller unit detects mains off-grid, and determined that the current charged ratio of the rechargeable battery is less than the first predetermined ratio and greater than the second predetermined ratio, and the negative value of the output power is not greater than the first predetermined power, and the output power is less than a second predetermined power, the microcontroller unit increases the frequency of the AC output from the AC power port by a third predetermined value.

9. The power conversion system of claim 8, wherein the second predetermined value is equal to the third predetermined value.

* * * * *